(12) United States Patent
Rohrbach et al.

(10) Patent No.: US 6,656,360 B2
(45) Date of Patent: *Dec. 2, 2003

(54) FIBROUS SYSTEM FOR CONTINUOUSLY CAPTURING METALS FROM AN AQUEOUS STREAM

(75) Inventors: Ronald Paul Rohrbach, Flemngton, NJ (US); Gordon William Jones, Toledo, OH (US); Peter Unger, Convent Station, NJ (US); Daniel Bause, Flanders, NJ (US); Russell Dondero, Atlanta, GA (US); Lixin Xue, Midilothian, VA (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,576

(22) Filed: Oct. 14, 1997

(65) Prior Publication Data

US 2002/0003110 A1 Jan. 10, 2002

Related U.S. Application Data

(63) Continuation-in-part of application No. 08/666,853, filed on Jun. 19, 1996, now Pat. No. 5,704,966, which is a continuation-in-part of application No. 08/363,500, filed on Dec. 23, 1994, now abandoned, application No. 08/949,576, which is a continuation-in-part of application No. 08/736,308, filed on Oct. 24, 1996, now Pat. No. 5,713,971, which is a continuation of application No. 08/363,500, filed on Dec. 23, 1994, now abandoned, application No. 08/949,576, which is a continuation-in-part of application No. 08/757,984, filed on Nov. 27, 1996, now Pat. No. 5,759,394.

(51) Int. Cl.$^7$ ................................................. C02F 1/28
(52) U.S. Cl. ................... 210/638; 210/648; 210/321.87; 210/502.1; 210/508; 210/912; 210/913
(58) Field of Search ................................ 210/638, 644, 210/648, 688, 321.87, 502.1, 508, 634, 912, 913

(56) References Cited

U.S. PATENT DOCUMENTS

3,957,504 A * 5/1976 Ho et al. ..................... 210/638

(List continued on next page.)

FOREIGN PATENT DOCUMENTS

| GB | 2 047 564 A | 12/1980 |
| WO | WO 97 48478 A | 12/1997 |

OTHER PUBLICATIONS

M. Goto et al.: "Removal and recovery of heavy metal ion by ion exchange fiber" Journal of Chemical Engineering of Japan, vol. 20, No. 5, Oct., 1987, pp. 467–472, XP002091860 Toyko, JP see p. 467–p. 468; figures 1–4.

*Primary Examiner*—Ivars Cintins (57) ABSTRACT

A unique filtration device (10) which removes metal ions from a contaminated aqueous stream through the use of partially hollow wicking fibers (20) impregnated with a selected liquid (18) which can capture the metal ions in the aqueous stream. The wicking fibers (20) are formed into a filter element (12) which extends from a chamber (16) through which the aqueous stream is directed into a chamber (18) wherein the unwanted metal ions are removed from the extracting liquid (18). The wicking fibers (20) include internal longitudinal cavities (22) each with a relatively small longitudinal extending opening (24). The wicking fibers (20) are filled with the selected liquid extraction (18) which remains within the fiber through capillary action by which capillary action the individual wicking fibers (20) rapidly draw the selected liquid,(18) with which they comes into contact, through the internal cavities (22). The liquid extrant (18) remains within the wicking fiber cavities (22) and generally does not enter the space between the wicking fibers (20) yet through the longitudinal openings (24) the liquid (18) is in full communication with the metals contaminated aqueous stream flowing through the filter (12) and past the individual fibers (20).

14 Claims, 6 Drawing Sheets

U.S. PATENT DOCUMENTS 5,057,368 A * 10/1991 Largman et al. ............ 428/397
5,704,966 A    1/1998 Rohrbach et al. ............ 95/170
5,713,971 A    2/1998 Rohrbach et al. ............ 55/223
5,759,394 A * 6/1998 Rohrbach et al. ......... 210/502.1

* cited by examiner

FIBROUS SYSTEM FOR CONTINUOUSLY CAPTURING METALS FROM AN AQUEOUS STREAM

This is a continuation-in-part of U.S. patent applications Ser. No. 08/666,853, filed Jun. 19, 1996 now U.S. Pat. No. 5,704,966, which is a continuation-in-part of Ser. No. 08/363,500, filed Dec. 23, 1994 now abandoned; Ser. No. 08/736,308, filed Oct. 24, 1996 now U.S. Pat. No. 5,713,971, which is a continuation of Ser. No. 08/363,500, filed Dec. 23, 1994 now abandoned; and Ser. No. 08/757,984, filed Nov. 27, 1996 now U.S. Pat. 5,759,394.

BACKGROUND OF THE INVENTION

1. Field of the Invention

This invention relates to a metals removing system and more particularly to a system for continuously removing metals from an aqueous stream.

2. Description of Prior Art

An example of a metal ion separation technique for the recovery of heavy metals is the use of liquid extraction system as a continuous technique to purify an aqueous stream. However, such liquid extraction techniques for removing metals from aqueous streams require large investments in mixer settler systems and are prone to large losses of liquid extractant due to carry over which poses downstream environmental problems. As a result relatively large quantities of liquid extract is lost and the and the process utilizes equipment with a large footprint.

It is desirable to provide a compact, economical metal removal system for the continuous removal of heavy metals either for environmental purposes or for mining operations which avoids the problems of large foot prints and loss of extractant over time.

SUMMARY OF THE INVENTION

The present invention provides a unique filtration device which continuously removes metals from aqueous streams through the use of a wicking fiber material containing a selected liquid extractant, which can capture the metal contaminants.

Wicking fibers have the ability to carry a liquid along their surface and to retain the liquid so it is not easily dislodged. Wicking fibers such as those disclosed in U.S. Pat. No. 5,057,368 are very small and well suited to the practice of the present invention. These generally hollow wicking fibers include internal longitudinal cavities each with a relatively small longitudinal opening extending to their outer surface. Through capillary action the individual wicking fibers rapidly draw the selected liquid, with which it comes into contact, through the internal cavities. The absorption liquid remains within the wicking fiber cavities and generally does not enter the space between the wicking fibers yet through the longitudinal openings the liquid is in communication with the fluid stream flowing past the wicking fibers.

Targeted metals are removed/recovered from the water stream by interposing a plurality of the wicking fibers which include in their internal cavities a liquid complexing agent having an affinity for the desired metals. The longitudinal extending opens in the wicking fibers permits the liquid retained in the wicking fiber cavities to interact with the aqueous stream and remove the targeted metals which are in the aqueous stream. A concentration factor induced molecular migration effectively conveys the undesirable metal molecules within the liquid extractant away from the aqueous stream to be cleaned, setting up a steady state concentration gradient with new metals continuously being absorbed and complexed within the supported liquid extractant.

This invention can be used in a customized fashion to either remove metals from a contaminated aqueous stream in a environmental remediation mode or to remove metals in a selective way in the mining/metals recovery area. Since this filter does not rely on liquid extraction in a traditional sense, wherein two immisicle liquids are mixed thoroughly together to provide as large of interfacial area as possible with the subsequent allowance for settling and separation of the two phases, the process with this supported phase can be accomplished in a much smaller volume and is more efficient and experiences far lower loses. The efficiency comes from the high interfacial area provided the liquid extractant. In the disclosed device the open space between the wicking fibers remain so that, in the aqueous stream, the flow can be through the media and the supported liquid extractant can come in contact most efficiently with the aqueous phase. A device according to the present invention provides for continuous use with or without periodic regeneration for the removing of metals from aqueous streams.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
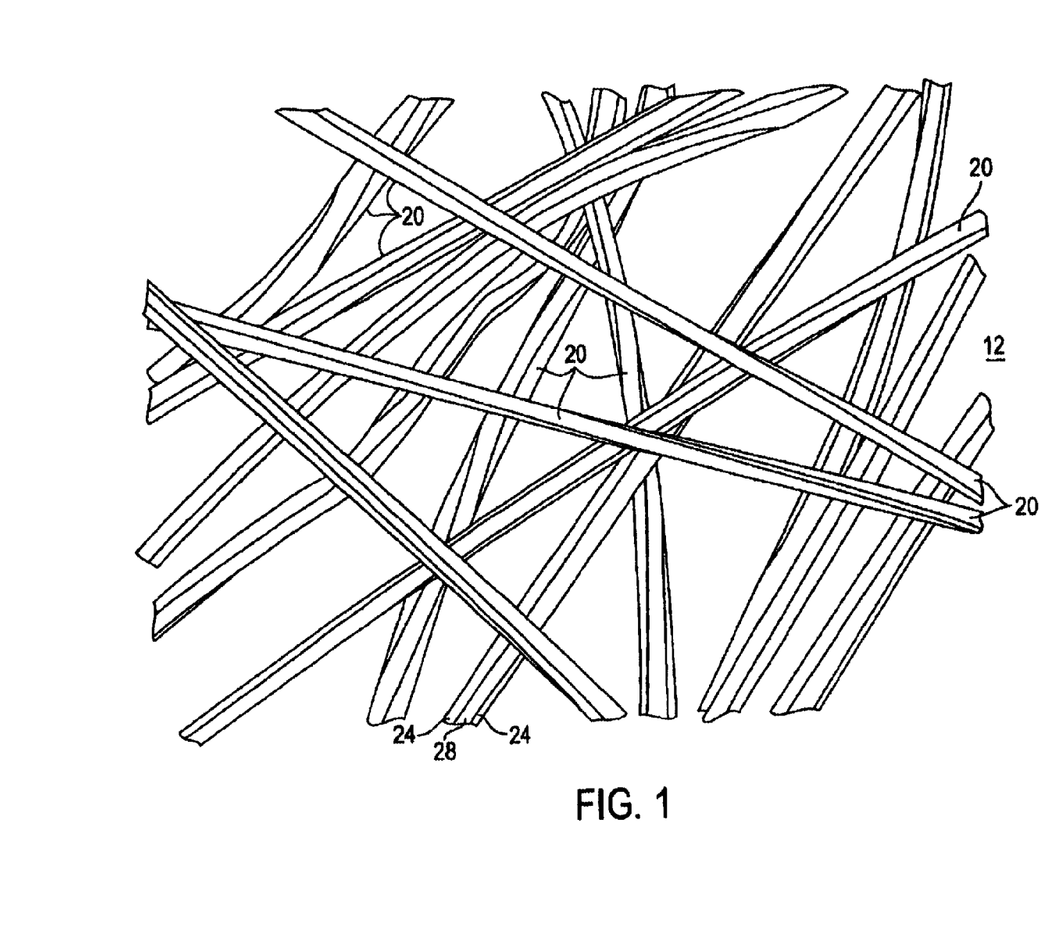
FIG. 1 is an enlarged view of a portion of a wicking fiber mat which is particularly suitable for practicing the present invention.
Figure 2:
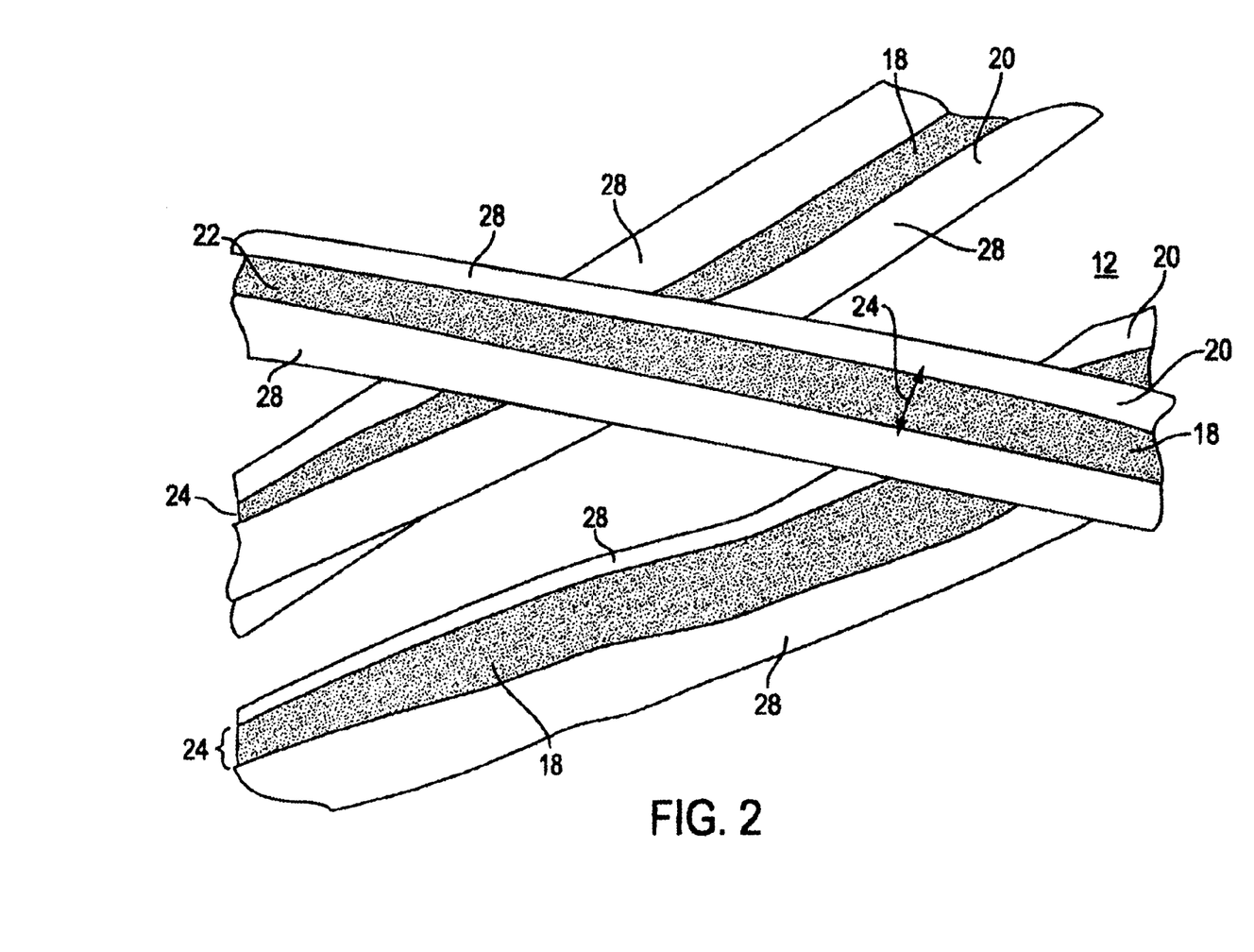
FIG. 2 is an enlarged view of several of the elongated wicking fibers shown in FIG. 1 showing the liquid extractant within the longitudinally extending fiber cavities.
Figure 5:
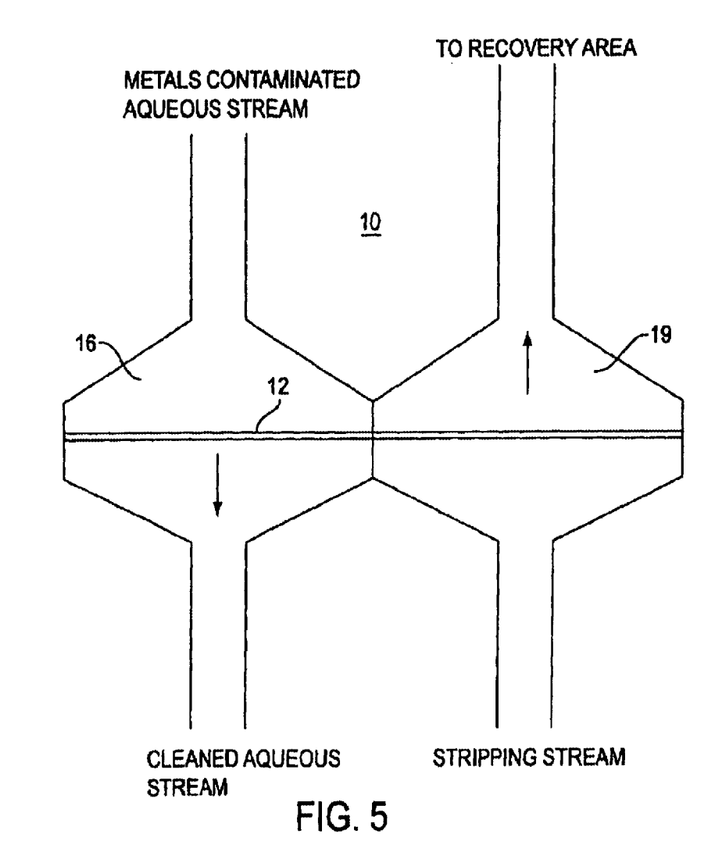
FIG. 5 is a diagrammatic illustration of a metals removal device according to the present invention.

Referring now to the drawings and FIGS. 1, 2 and 5 in particular there is shown a continuous metals removing system 10 utilizing wicking fibers 20 impregnated with a metals extractant liquid 18 according to the present invention. Metals removal system 10 utilizes a filter element 12 formed from numerous wicking fibers 20, as shown in FIGS. 1 and 2, containing a liquid chelating or ion exchanging liquid extractant.

The metals extracting liquid 18 typically consists of a solvent with a liquid chelating or ion exchanging reagent dissolved therein. The chelating agents or ion exchanging reagents are added to the solvent to enhance the solubilization of the metal of interest. The solvent carrier preferably is a hydrophobic water insoluble solvent. The metal extracting liquid 18 which has an affinity for various metals is selected and disposed within internal channels or cavities 22 formed in the individual wicking fibers 20. The possible combinations of liquid carriers and absorption assisting agents are nearly unlimited as is well know to those skilled in the art. The liquid carrier selected should be capable of extracting a particular metal from a pregnant aqueous stream.

Figure 3:
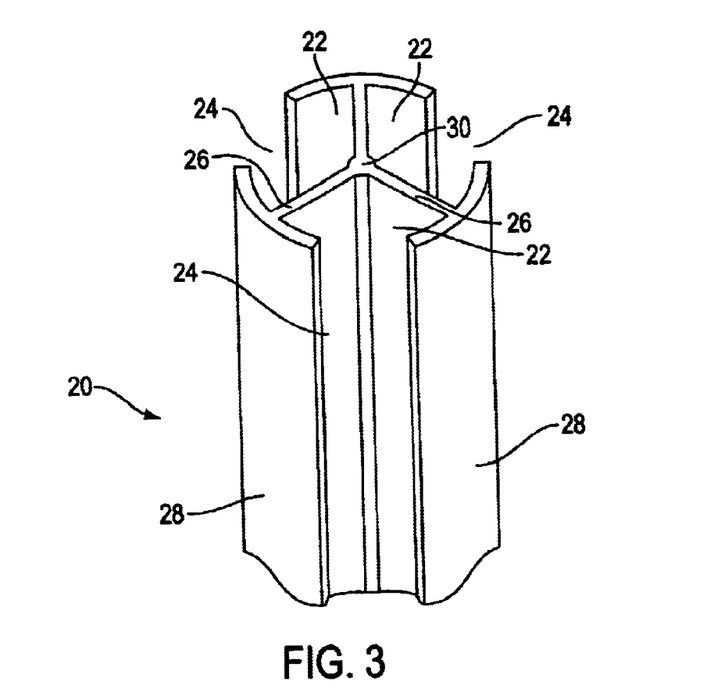
FIG. 3 is an enlarged view of a wicking fiber which is particularly suitable for practicing the present invention.
Figure 4:
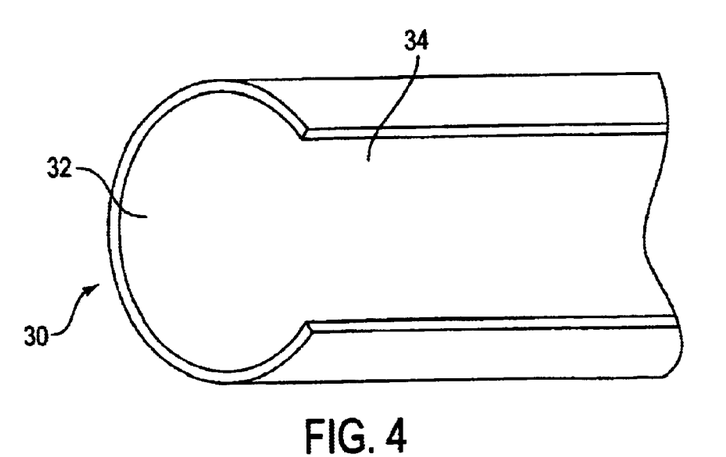
FIG. 4 is an enlarged view of another wicking fiber which can be used for practicing the present invention.

A wicking fiber which is particularly suitable for practicing this invention is shown in FIG. 3 and disclosed in U.S. Pat. No. 5,057,368. This patent discloses a trilobal or quadrilobal fiber 20 formed from thermoplastic polymers wherein the fiber has a cross-section with a central core 30 and three or four T-shaped lobes 26. The legs of the lobes intersect at the core 30 so that the angle between the legs of adjacent lobes 26 is from about 80 degrees to 130 degrees. The thermoplastic polymer is typically a polyamide, a polyester, a polyolefin or a combination thereof. The wicking fiber 20 as illustrated in FIG. 3 is formed as an extruded strand having three hollow interior longitudinally extending cavities 22 each of which communicates with the outer strand surface by way of longitudinal extending slots 24. The wicking fibers 20 are relatively small having a diameter of 30 to 250 microns. The capillary forces within the individual cavities 22 are so much greater than those external to the fiber 20 that the metal extracting absorptive liquid 18 is readily wicked up the interior of the fiber 20 without appreciable wetting of the external surfaces 28 or filling the space between the fibers 20. The fibers 20 strongly retain the liquid 18 through capillary action so that the fiber mat 12 is not wet to the touch and the liquid 18 will not shake off. In a filter mat 12 of such wicking fibers 20 the area between the individual strands remains relatively free of the metal extracting liquid 18 with which the internal cavities 22 of each fiber 20 are filled. The filter element 12 may be made of one or more type of wicking material strands such as polyamide, polyester, or polyolefins. The three T-shaped cross-section segments may have their outer surface 28 curved, as shown, or straight. While the wicking fiber 20 is depicted as three lobed other number of lobes are suitable. In addition other internal wicking fibers may be used. A C-shaped fiber 30, as shown in FIG. 4, or other cross sections may also be suitable for wicking the metal extracting liquid. The C-shaped fiber 30 includes an internal longitudinally extending channel 32 which is connected to the outer surface by a longitudinally extending slot or opening 34. The metal extracting liquid 18 is held by capillary force within the longitudinally channels 32 and only comes into contact with the metals contaminated aqueous stream along said longitudinally extending openings 34. The metals contaminated aqueous stream is directed over a filters 12 formed from the wicking fibers 20 or 30 into contact with the metals extracting liquid 18 and the contaminating metal ions are absorbed into the extracting liquid 18 through the openings 24 or 34.

The specific shape of the wicking fibers is not important so long as the fibers selected can move the metals extracting liquid, with which it comes into contact, along its surface and then hold the metals extracting liquid to its surface so that it is not easily displaced when placed in the metals contaminated aqueous stream.

Many common materials which are effective wicking agents may restrict circulation of air through the material. For example, wetting a common handkerchief with water essentially seals the material against air flow there through. By using internal wicking fibers where the metals extracting liquid is maintained within the cavities 22 of fiber 20 unrestricted fluid flow of the metals contaminated aqueous stream about the outside of the individual wicking fibers 20 is maintained.

Referring now to FIG. 5 there is shown a diagrammatic illustration of a metals removal device 10 according to the present invention. Device 10 includes a filter 12 formed of fibers 20 with a metals extracting liquid 18 disposed in the channels 22. The disclosed metals removal system 10 includes a metals removal chamber 16 and a stripping or cleaning chamber 19. The fiber mesh or filter element 12 consists of numerous wicking fibers 20 disposed and oriented to extend within both chambers 16, 19. A housing (not shown) can be formed around the outside of the device 10. The metals removal system 10 is constructed so that the two chambers 16, 19 are separate. A partition within device 10 separates chamber 16 from chamber 19. The metals contaminated aqueous stream to be cleaned enters chamber 16 and is directed through the portion of the impregnated fiber mesh 12 which is disposed across chamber 16. All of the contaminated aqueous stream through chamber 16 must flow through the wicking fiber mesh 12. Fiber mesh 12 is constructed with many wicking fibers 20 impregnated with the metals extracting liquid 18 and has sufficient thickness so that the entire aqueous stream flowing through chamber 16 comes into intimate contact with the selected liquid 18 within the cavities 22 of the wicking fibers 20. The selected liquid 18 which has an affinity for the targeted metal ions or molecules absorbs the metal ions or molecules and thus removes them from the metals contaminated aqueous stream flowing through chamber 16.

The wicking fibers 20, containing the liquid 18 with the absorbed targeted metal ions or molecules, extends into a stripping or cleaning chamber 19 wherein a liquid stream passes over the wicking fibers 20 and strips away and carries to a recovery area the targeted metal ions. A concentration factor induced molecular migration effectively conveys the targeted metal ions within the liquid 18 from the aqueous stream to be cleaned within chamber 16 into the stripping stream flowing through chamber 19. The stripping fluid stream may be heated or otherwise modified to facilitate removal of the targeted metal ions. The direction of flow of the fluid streams flowing through chambers 16 and 19 is not important. The size of chambers 16 and 19 and the flow rates of the fluid streams can be designed to suit a particular application. The selected liquid 18 acts as a shuttling carrier capable of transporting the captured metal ions across the partition to the stripping chamber 19 and returning again via the generally parallel arrangement of fibers 20. A concentration factor induced molecular migration effectively conveys the targeted metal molecules within the liquid extractant 18 away from the metals contaminated aqueous stream to be cleaned, setting up a steady state concentration gradient with new metals continuously being absorbed and complexed within the supported liquid extractant 18.

The method of operation and the apparatus of this invention should now be clear. Desirable or undesirable aqueous metal streams can be freed of their metals by interposing a plurality of at least partially hollow wicking fibers 20 in the water stream. The hollow portions 22 of the wicking fibers contain a liquid 18, including a component having an affinity for the targeted metal ions, which communicates with the aqueous stream through an opening 24. The metal ions are extracted by the liquid 18 within the wicking fibers 20. The metals ions in solution within the liquid 18 are then effectively removed from the aqueous stream.

The wicking fiber approach of the present invention has significant advantages over the use of conventional liquid/liquid extraction systems. The impregnated wicking fibers 20 can have an extremely high extracting capacity, many times greater than conventional particulate ion exchange or chelating resin adsorbents. The wicking fiber filter 10 can be impregnated with liquids to remove a broader range of metals such as copper, cadmium, lead, iron, nickel, zinc, chromium, silver, or the like.

The present invention is particularly suited to the mining industry such as in the copper ore recovery industry which uses acid leachates to remove the copper from the ore and subsequent liquid extraction to concentration the copper before electrowinning. Equally this device could be used as a remediation device for the removal of unwanted metal contaminants in aqueous streams. The disclosed invention provides a compact, economical metals extractor 10 for the removal of metal ions from aqueous streams which avoids the problems of large equipment requirements and high losses of liquid extractant along with improved removal efficiency.

The present wicking fiber support or carrier 12 may be impregnated with a variety of chemical extractants composed of selective ion-pairing or metal extraction agents for the particular metal of interest. Active metal extractants suitable for use in this invention are liquid complexing agents which preferably are homogeneously dispersed in the present wicking fiber support 12 and exhibit a strong affinity to the polymer support. In certain cases, a polymer with a functionalized surface may be used, enabling the agent to form a strong bond or complex with the functional groups, such as the hydroxyl groups, present throughout the surface of the polymer. Alternatively, hydrophobic interaction of the organic metal extractant with the polymer surface may be sufficient to fix the metal extractant 18 within the wicking fiber 20, especially when the capillary forces of the microchannels 22 within the wicking fiber 20 are considered.

Examples of suitable extractants 18 may have cationic, anionic or neutral charges (see C. K. Gupta and T. K. Mukherjee, in Hydrometallurgy in Extraction Processes, CRC Press, Inc., 1990, pp.74–92). Also, a number of suitable acidic extractants 18 are characterized by their ability to chelate the metal ion, such as diketones, oximes, oxines, and the like and mixtures thereof, each of which contain both acidic and basic chemical functionalities. When these extractants 18 are contacted with target metals in solution according to the process of the present invention, the extractants 18 and metals interact to form chelated salts. This interaction demonstrates the remarkable selectivity and affinity for metals possessed by these extractants 18. For example, the hydroxyoxime extractant Moc-45™ displays a pH-dependent ability to selectively recover copper in the presence of ferric ion. Other chelating type oxime extractants are available from Henkel Corp. (LIX 63 and 64), Sherex Chemicals Co. (Kelex-100), and Acorga Ltd.(P-5000 series).

Other cationic extractants 18 suitable for use in the present invention include non-chelating extractants such as alkyl carboxylic, phosphoric and phosphonic acids. The interaction between non-chelating group extractants and target metals is more complex than that occurring with chelating group extractants but are generally based on charge relationships. Metal ions are extracted in the order of their basicity, with improvements in extractability evident as the metal becomes more basic.

Another suitable class of extractants 18 include the anionic extractants, such as the tertiary and quaternary amine agents selected from the group consisting of methyltricaprylylammonium chloride, methyltrioctylammonium chloride, 1-octanaminium, N-methyl-N,N-dioctyl-, chloride, tricaprylmethylammonium chloride, tricaprylylmethylammonium chloride, and trioctylmethylammonium chloride. Such anionic extractants may be obtained from Henkel Corp., Minneapolis Minn., under the tradename "ALIQUAT®" or "ALAMINE®".

Also suitable are the neutral extractants 18, which include several solvating agents that function by coordinating with the metal in solution while simultaneously displacing water molecules associated with that metal. This interaction results in the formation of a neutral complex that is sequestered within the hydrophobic environment provided by the neutral solvent impregnated within the porous carrier body of the present invention. Examples of neutral extractants 18 include tributylphosphate (TBP), methyl-iso-butyl ketone (MIBK), mixtures thereof, and the like.

A summary of the various classes of metal extractants 18 including the manufacturers and typical uses are provided in the following tables. This information was taken from C. K. Gupta and T. K. Mukherjee, in Hydrometallurgy in Extraction Processes, CRC Press, Inc., 1990, pp.78–82.

| TYPE | TRADEMARK | MANUFACTURER | TYPICAL USE |
|---|---|---|---|
| COMMERCIAL CATIONIC EXTRACTANTS | | | |
| Carboxylic acid | Napthenic Acid | Shell Chemical | Cu/Ni separation |
| | Versatic Acid | Shell Chemical | Cu/Ni Separation |
| Phosphoric Acid | DEHPA | Mobil Chemicals | U from Phosphoric acid Co/Ni Separation |
| | HOSTAREX PA-216 | Hoechst A.G. | Zn Extraction Rare Earths |
| Phosphonic Acid | PC-88A | Daihachi Chemical | Ni/Co Separation Rare Earths |
| | CYANEX CNX CYANEX 272 | American Cyanamid (Cytec) | Co/Ni Separation |
| Chelating Type | Kelex 100 | Sherex Chemicals | Cu Extraction |
| | LIX 64 | Henkel Corp. | Cu Extraction Cu/Ni/Co from Ammoniacal Soln. |
| | LIX 63 | Henkel Corp. | Cu Extraction |
| | P-5000 Series | Acorga Ltd. | Cu Extraction |
| β-diketone | Hostarex DK-16 | Hoechst, A.G. | Cu/Zn Extraction from Ammoniacal Soln. |
| | LIX 51 | Henkel Corp. | Cu/Co Extraction |
| | LIX 54 | Henkel Corp. | Cu/Co Extraction |

-continued

| TYPE | TRADEMARK | MANUFACTURER | TYPICAL USE |
|---|---|---|---|
| COMMERCIAL ANIONIC EXTRACTANTS | | | |
| Primary Amine | Primene JN-T | Robin & Haas | Fe from Sulfate Soln. |
| Secondary Amine | LA-1 & LA-2 | Rohm & Haas | U from Sulfate Soln. |
| | | | Co from Chloride Soln. |
| | Adogen 283 | Sherex Chemicals | As above |
| Tertiary Amine | Alamine 336 | Henkel Corp. | U/V/Mo/W from Sulfate |
| | Hostarex- A 327 | Hoechst A.G. | Co/Cu from Chloride |
| | Adogen 364 | Sherex Chemicals | PGM metals |
| Quaternary Amine | Aliquat 336 | Henkel Corp. | V/Cr/W/Cu |
| | Adogen 464 | Sherex Chemicals | Rare Earths |
| | Hoe 5 2706 | Hoechst, A.G. | Oxyanionic Metals |
| COMMERCIAL NEUTRAL EXTRACTANTS | | | |
| Phosphoric Acid Ester | TBP | Union Carbide | Fe from Cl Soln |
| | | Albright & Wilson | U Extraction |
| | | Daihachi | Rare Earths |
| Phosphine Oxide | TOPO | American Cyanamid | Extraction of $U^{VI}$ |
| | | Albright & Wilson | from $H_3PO_4$ with DEHPA |
| Methyl-isobutyl ketone | MIBK | N/A | Hf from Zr |
| | | | Au from Cl Soln. |
| Alkyl Sulfides | Di-n-hexyl sulfides | N/A | Extraction of Pd from Cl Solns. |

Any active agent impregnating methods known in the art to be suitable for impregnating polymeric fiber materials may be employed to impregnate the wicking fibers 20 of the present invention. The simplest technique may be to merely submerge the wicking fiber support 12 material in the active agent impregnant, and allow the excess fluid to drain away by gravity. Alternatively, one edge of the wicking fiber support 12 may be contacted with the liquid impregnate 18, and the liquid may be allowed to naturally wick into the support. In the latter example, no draining step is required, since the wicking fiber support matrix 12 will draw in only enough liquid 18 to fill the cavities, and wet the surfaces.

In a preferred embodiment, the wicking fiber support matrix 12 is first thoroughly washed to remove any extraneous material from the fiber matrix. The fiber matrix 12 may then be treated with a surfactant or other surface modifying agent in order to facilitate the impregnation step, which follows. At this step, also, the surface may be chemically modified with oxidative or other reagents to enhance the wicking fiber 20 surface. Preferably, the wicking fiber matrix support 12 is exposed to a volumetric excess, i.e. from about 10% to about 150% and preferably about 25% to about 50%, of the selective metal extractant which may be dissolved in a suitable diluent, such as kerosene, at concentrations ranging from 10% to 100%, preferably 45% to 55%, based upon the weight of the extractant 18. Modifiers are also frequently added to the solvent system to prevent formation of the third phase and to improve solubility of the metal complex. These modifiers may include long-chain alkyl alcohols such as octanol or isodecanol, or may consist of another extractant belonging to the neutral category such as tributylphosphate (TBP). Other modifiers may include nonylphenol, 2-ethylhexanol and the like. Excess liquid may then removed from the impregnated fiber matrix 12 by vacuum filtration, gravity drain or light blotting. One skilled in the art can readily determine without undue experimentation that the solvent impregnated wicking fiber matrix 12 should be dried for a period of time sufficient to achieve the predetermined solvent content desired within the fiber. At the laboratory scale with amounts less than 1 gallon, the process of removing bulk fluid following thorough impregnation of the porous carrier may be performed using a fritted funnel and a vacuum flask. The wet fiber is placed in a fritted funnel of coarse porosity fitted to a side-arm vacuum flask attached to house vacuum; typically generating 19–23 in. Hg vacuum. The excess fluid is then allowed to be drawn into the flask by the application of vacuum. The partially dried impregnated fiber matrix 12 may then be further dried by placing the material in a vacuum oven and heated to 55° C. under 19–23 in. Hg vacuum for a period of time sufficient to achieve the desired degree of dryness. An additional drying process might involve purging the filter-dryer with dry gas, which is preferably nitrogen, but any inert gas such as helium or argon may be used. Typically, for MOC-45™-impregnated material, a kerosene content of 10–45% kerosene on a weight basis is desired. The kerosene content may be determined using physical techniques such as thermogravimetric analysis.

The resulting impregnated wicking fiber is suitable for use in a contactor having the appropriate format desired, such as a fixed bed, moving bed or batch contactor, under conventional methods known in the art. See Shelby A. Miller in Perry's Chemical Engineers' Handbook, McGraw-Hill Book Co., New York, 5th Ed., 1973, Section 19, pg. 19–40–19–48. A fixed-bed format is preferred in the present invention. An additional contact method allowed by this unique fiber format is the use of a moving belt contactor. In this arrangement, the impregnated fiber matrix 12 may be in the form of a continuous loop in which the a fiber belt may be drawn first through the metal bearing solution, and then onto a stripping contactor, and then through a final wash contactor before returning to the initial step to complete the cycle. This sort of arrangement allows the use of a relatively small amount of extractant 18 to perform the job of a much larger amount of extractant in a discontinuous or fixed bed process.

In the process of the present invention, an aqueous stream containing various metal salts is passed over the contactor in order to selectively remove a particular metal from the aqueous stream and thereby concentrating the metal within the wicking fiber matrix 12 impregnated with the selective metal extractant 18. The aqueous stream may be fed, preferably without filtration or pretreatment and at ambient temperature, through the column in either an upflow or a downflow direction. Optionally, a jacketed column may be employed to allow thermosetting to the optimum temperature desired for a specific application. Examples of metal salts which may be removed from an aqueous stream include copper, cobalt, chromium (III & VI), cadmium, nickel, zinc, platinum, palladium, gold, radium, vanadium, lead, zirconium, hafnium, tin, tantalum and other transition elements. Many other metal species may also be treated such as rare earth elements and light metals. The extractant which is impregnated within the porous matrix defines the selectivity and affinity of the resin.

Nonmetallic components, and metals for which the metal extractant 18 contained within the wicking fiber matrix 12 has no affinity, pass unhindered through the contactor into the waste. The metals which were sequestered within the selective metal extractant 18 impregnated within the wicking fiber matrix 12 may be recovered by passing an appropriate solution, i.e. stripping solution, over the contactor. The nature of this stripping solution depends entirely on the type of metal extractant 18 impregnated within the porous fiber matrix 12 and on the characteristics of the metal-ligand complex which forms between the metal and the selective extractant 18. The stripping solution may be selected by one skilled in the art without undue experimentation. For example, copper ions which have been sequestered by the MOC-45™ metal extractant impregnated within the wicking fiber matrix may be stripped or displaced from the extractant by the use of aqueous sulfuric acid at a molar concentration of 1.0 to 2.0, preferably 1.5 to 1.75. Typically for this application, sulfuric acid diluted to about 100 g/l to about 200 g/l in water may be used. This dilute sulfuric acid need not be pure and may also contain up to about 25 g/l of copper or other metals. Other suitable stripping agents may be selected from the group of inorganic acids including hydrochloric, phosphoric, and perchloric. Dilute sulfuric acid is the preferred stripping solution for Moc45™-impregnated material.

The family of tertiary and quaternary amine metal extractants 18 such as the Alamine® and Aliquat® series may be stripped using a broad range of generally basic salt solutions including ammonia, sodium hydroxide, sodium carbonate, sodium bicarbonate, ammonium chloride, ammonium nitrate, and mixtures of the above plus sodium chloride.

The metal extractant 18 impregnated within the wicking fiber matrix 12 may generally be stripped therefrom by modifications of procedures known in the art. Process parameters, such as reagent concentrations, inclusion of scrubbing or washing stages, additives, temperatures and flow rates are typically determined only after a number of laboratory trials.

The metal may be recovered from the metal-rich stripping solution by current commercial methods of metal recovery. See C. K. Gupta and T. K. Mukherjee, in Hydrometallurgy in Extraction Processes, CRC Press, Inc., 1990, chapter 3. For example, copper may be recovered as copper metal ($Cu^0$) by the process of electrowinning, a widely used technique which is well known in the literature and industrial practice. Another common method for recovering copper from the metal-rich stripping solution is by allowing the highly concentrated copper sulfate in the stripping solution to crystallize, and thereafter recovering the metal as crystalline copper sulfate.

The composition and process herein may be useful in several applications wherein it is desirable to selectively recover or remove metals from an aqueous stream. Examples of such applications include, but are not limited to, the metal finishing industry, metal-bearing wastewater from industrial processes, hydrometallurgy, and environmental remediation of groundwater and bodies of water.

The composition and process described herein overcome several problems encountered in prior art metal recovery processes. For example, one difficulty encountered by the prior art support mediums is that the support mediums have a low chemical affinity for the active agents. Thus, the agents are easily leached out of the support medium during normal use. Because the composition of the present invention employs a novel support medium having excellent characteristics, such as a large usable internal volume, mechanical robustness, and negligible shrinking and swelling, as well as an appropriate surface chemistry, the support medium is capable of retaining the active agents over a longer period of time than the prior art support media. Therefore, when the claimed composition is incorporated in the claimed process for separating metals from mixed aqueous streams, not only will better efficiency of metal removal be obtained in comparison to that of prior art methods, but the claimed process also can advantageously run on a continuous basis for a longer period of time without replacing the impregnated wicking fiber 20. In addition, if used in a continuous loop process, the reagent impregnated within the wicking fiber 201 belt may be easily renewed by the continuous reapplication of fresh extractant 18.

The following examples are merely illustrative of our invention and should not be considered limiting in any way.

EXAMPLE 1

Retention of Liquid Reagents within the Wicking Fiber Support Matrix

The following example was performed in order to demonstrate the retention of liquid reagents within the impregnated wicking fiber 20 under conditions of very high aqueous flows. Silicone oil was chosen as the liquid impregnant in this experiment, to simulate a non water-soluble organic extractant. A circular filter element, comprised of nonwoven polypropylene wicking fiber 20, was impregnated with an excess of silicone oil (high temperature, Aldrich Chemical), placed in a filter housing, and then exposed to very high water flow rates. The unimpregnated, initial dry filter pad had a weight of 0.1022 g. The maximum intrafibrillar void space would accommodate approximately an equal weight of silicone oil, yielding a final expected weight of 0.2044 g. The water flow rates chosen for this study were 6.15 $GPM/Ft^2$, or approximately 167 bed volumes per minute and 12 $GPM/Ft^2$, or 326 bed volumes per minute Typical flow rates encountered industrially are 1–2 $GPM/Ft^2$, or about 8–16 bed volumes per hour. Therefore, the rates used in this study are much greater (as much as ten-fold higher) than those which would be expected in actual use. The oil impregnated filters were exposed to 6.15 $GPM/Ft^2$ for a period of 86 hours, and at the higher flow for 21 hours, over a period of several weeks. At the end of these flow treatments, the measured weight of the impregnated filter was 0.2291 g, or just slightly higher than that expected for a fully impregnated filter. These results indicate that the liquid impregnant remained firmly within the wicking fiber channels 22 despite the very high aqueous flow treatment.

EXAMPLE 2

Retention of Solid Particulate Agents within the Wicking Fiber Support Matrix

This example was performed in order to demonstrate that wicking fiber 20 impregnated with solid adsorbent particulate materials may be used under conditions of very high aqueous flows with little concern about loss of material from the fiber bed. In a manner similar to that described in the preceding example, a circular filter element comprised of nonwoven polypropylene wicking fiber 20 was impregnated with finely divided activated carbon powder, and then exposed to very high water flow rates. The wicking fiber element 12 was impregnated with powdered activated carbon (Calgon Centaur, average particle diameter—<10 micrometers) to a final dry weight of 0.1407 g. The filter 12 was exposed to the same high aqueous flows for the same durations as listed in Example 1, above. Following the flow treatment, the filter 12 was dried in a convention oven for one hour at 100 C. and weighed. The final dried weight was found to be 0.1451 g, or very similar to the initial weight, indicating no measurable loss of particulate impregnant. The very slight gain in weight was probably due to water firmly adsorbed to the carbon surface.

EXAMPLE 3

Preparation of MOC45-impregnated Wicking Fiber Fixed-bed Support for Metals Removal A sheet of nonwoven polypropylene wicking fiber fabric 12 (1.5 oz. per sq. yd./3 denier per filament) was cut to dimensions of 50 cm×18 cm, weighing 5.25 g. The dry wicking fiber fabric 12 was then immersed in a volumetric excess of MOC45/Kerosene to wet and fully impregnate the fiber 20. The excess reagent was expressed from the soaked fiber fabric 12 by hand, and the fabric 12 was then air dried in a hood under constant airflow for a period of 16 hrs. The final weight of the MOC45-impregnated wicking fiber sheet 12 was 18.4 g.

The MOC45-impregnated wicking fiber sheet 12 was then laid over polypropylene screen mesh and then rolled tightly into a tube or "jellyroll" form. The rolled sheet was then inserted into a glass column, 2.3 cm diameter×25 cm length (Kontes Glass). A slight excess of the impregnated fiber sheet was trimmed away, leaving a weight of 12.48 g of impregnated material within the column.

Final bed dimensions were as follows:

| | |
|---|---|
| Bed Diameter - | 2.3 cm |
| Bed Depth - | 17 cm |
| Bed Volume - | 70.63 cm$^3$ |

Impregnated Wicking Fiber Fabric Parameters:

| | |
|---|---|
| Impregnated Fabric Area - | 603 cm$^2$ |
| Dry Fabric Weight - | 3.515 g |
| Impregnated Fabric Weight - | 12.480 g |
| MOC45 Extractant Weight - | 8.965 g |
| Extractant Density - | 0.127 g MOC45/ cm$^3$ Bed Volume |

The column prepared in this example was used to examine the metals loading characteristics as described in the following example.

EXAMPLE 4

Examination of the Metal Loading Characteristics of MOC45-impregnated Wicking Fiber Column Copper breakthrough analysis was performed by passing a solution of 2 g/l copper sulfate over a column containing MOC45-impregnated wicking fiber fabric 12 as described in Example 1. The total volume of the column was 103.9 cm3, and the freeboard above the MOC45-impregnated fiber bed was 33.24 cm3. The breakthrough analysis was performed at ambient temperatures, and the copper sulfate solution flow rate was about 54 cm$^3$/min., or about 0.75 bed volumes per minute.

Figure 6:
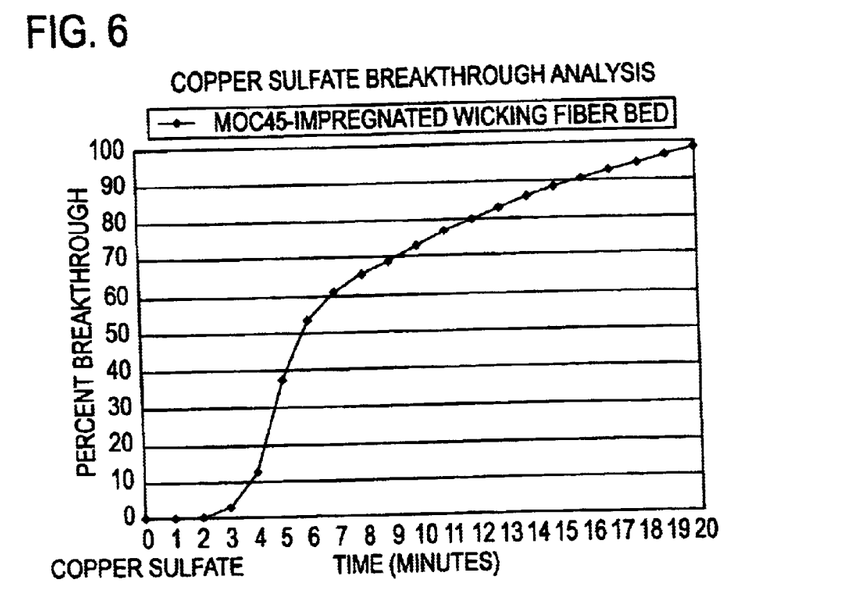
FIG. 6 is a graph showing the results of a first copper breakthrough analysis; and, FIG. 7 is a graph showing the results of a second copper breakthrough analysis.

The effluent from the column was passed through an ultraviolet absorbance detector, set at 254 nm wavelength, and using a path length of 20 mm. The amount of copper in the effluent was determined by the absorbance at 254 nm. A standard curve was prepared in which the absorbance at 254 nm of various concentrations of copper sulfate was plotted vs. copper concentration. The standard curve was found to be essentially linear and in accordance with Beer's Law. Results of this copper breakthrough analysis are shown in FIG. 6. The good chromatographic performance of the impregnated wicking fiber support 12 is illustrated by the rapid rise in copper concentration between 5–10 minutes. The copper capacity of the resin was found to correspond to a significant proportion of the theoretical maximum, based on the amount of MOC45 immobilized within the impregnated wicking fiber 20, indicating good utilization of the available reagent activity.

Following this loading cycle, the column was rinsed with water to a neutral pH, and the copper was stripped from the MOC45-impregnated wicking fiber bed 12 with a 10% aqueous solution of sulfuric acid (v/v, ca. 1.8 M) at a flow of 34 cm$^3$/min.

Figure 7:
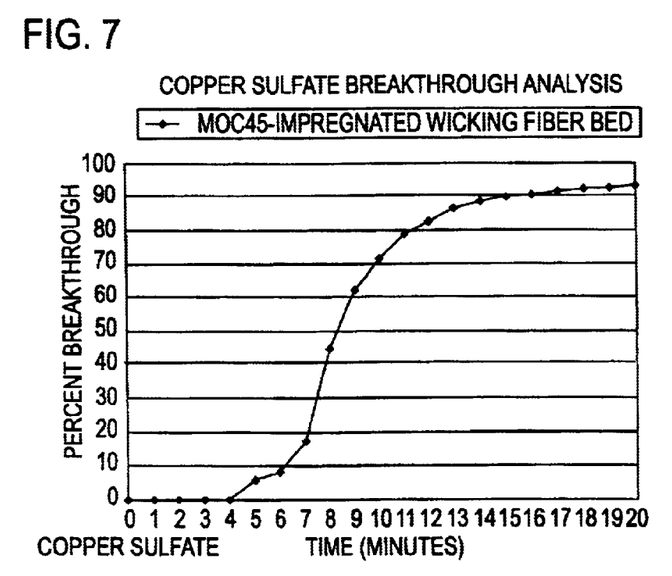

The stripped and washed column was then subjected to an additional copper sulfate breakthrough analysis, using an aqueous feed solution containing 2.5 g/l copper sulfate at a flow of 24 cm$^3$/min. The breakthrough analysis, again, was performed at ambient temperatures, and the effluent was monitored by UV absorbance at 254 nm. Results of this second breakthrough analysis are shown in the FIG. 7.

What is claimed is:

1. A device for continuously removing targeted metal ions from a stream of a first liquid and releasing them into a stream of a stripping liquid, comprising:

a plurality of wicking fibers, each including a longitudinally extending channel with a longitudinally extending opening;

a second liquid, the composition of which may be the same as or different from said stripping liquid, having an affinity for the targeted metal ions disposed within the channels of said plurality of wicking fibers;

means for directing the stream of first liquid across a part of said plurality of wicking fibers into contact with said second liquid along said longitudinally extending openings whereby said second liquid absorbs the targeted metal ions; and said plurality of wicking fibers disposed to extend longitudinally from the stream of first liquid into the stream of stripping liquid which strips the targeted metal ion from said second liquid.

2. Apparatus for removing metal ions from a stream of a first liquid comprising:

a plurality of elongated fibers, each having a longitudinally extending channel including a longitudinally extending opening from the channel to the outer fiber surface;

a second liquid, disposed within the internal cavities of said plurality of elongated fibers, that can absorb the metal ions;

a flow path for the stream of first liquid containing the metal ions to be removed, said path directed over a portion of said plurality of elongated fibers whereby the metal ions to be removed are absorbed by said second liquid; and removing means for removing the absorbed metal ions from said second liquid.

3. Apparatus as claimed in claim 2 wherein the longitudinally extending channel in each of said plurality of elongated fibers is sized so that said second liquid is retained within the channel by capillary forces.

4. Apparatus as claimed in claim 2 wherein the metal ions to be removed which are absorbed by said second liquid are moved from said flow path to said removing means by a concentration factor induced molecular migration which effectively conveys the absorbed metal ions away from the stream of first liquid.

5. Apparatus as claimed in claim 2 wherein the first liquid is water.

6. Apparatus as claimed in claim 2 wherein a plurality of channels, each including a longitudinally extending opening to the outer fiber surface, are formed in each fiber.

7. A filter for removing a selected type of metal from a stream of a first liquid comprising:

a plurality of elongated fibers, each having an elongated open channel extending into the interior of the fiber, disposed to form a fiber filter mat; and a second liquid which has an affinity for the selected type of metal disposed within the channels and having an exposed portion near the exterior of the filter for absorbing the selected types of metal as the stream of first liquid is directed to pass through the filter.

8. A filter as claimed in claim 7 wherein each fiber includes a plurality of elongated open channels within which the second liquid is disposed.

9. A filter as claimed in claim 7 wherein the fibers are disposed in generally a parallel alignment in the fiber filter mat.

10. A filter as claimed in claim 7 wherein the fibers are disposed randomly in the fiber filter mat.

11. A method for continuously removing specific types of metal ions from a stream of a first liquid comprising the steps of:

a. selecting a second liquid which has an affinity for the specific types of metal ions to be removed;

b. placing the second liquid on a mat formed from a plurality of wicking fibers which have the ability to move the second liquid along their surface yet retain the second liquid within longitudinally extending channels, each of which has a longitudinally extending opening to the wicking fiber outer surface, against moving into the space between the individual wicking fibers; and c. directing the stream of first liquid through a portion of the mat into contact with the second liquid along the longitudinally extending openings whereby the second liquid absorbs the specific type of metal ions.

12. A method as claimed in claim 11 including the additional step of:

d. directing a stripping fluid stream through a different portion of the mat so that the specific type of metal ions, which have been absorbed by the dispersed throughout the second liquid, are stripped away.

13. The method as claimed in claim 11 wherein the metal ions are selected from the group consisting of copper, cobalt, chromium (III & VI), cadmium, nickel, zinc, platinum, palladium, gold, radium, vanadium, lead, zirconium, hafnium, tin, and tantalum.

14. The method as claimed in claim 11 wherein the second liquid comprises liquid extractants or ion exchange extractants.

* * * * *